US012579761B2

(12) United States Patent
Qian et al.

(10) Patent No.: US 12,579,761 B2
(45) Date of Patent: Mar. 17, 2026

(54) ALIGNMENT OF VIRTUAL OVERLAY BASED ON TRACE GESTURES

(71) Applicant: Medivis, Inc., New York, NY (US)

(72) Inventors: Long Qian, Watchung, NJ (US); Christopher Morley, New York, NY (US); Osamah Choudhry, New York, NY (US); Alton Harmer Wiggers, New York, NY (US)

(73) Assignee: Medivis, Inc., New York, NY (US)

( * ) Notice: Subject to any disclaimer, the term of this patent is extended or adjusted under 35 U.S.C. 154(b) by 89 days.

(21) Appl. No.: 18/243,402

(22) Filed: Sep. 7, 2023

(65) Prior Publication Data

US 2024/0412464 A1      Dec. 12, 2024

Related U.S. Application Data

(63) Continuation-in-part of application No. 18/208,136, filed on Jun. 9, 2023.

(51) Int. Cl.
*G06T 19/00* (2011.01)
*G06F 3/01* (2006.01)

(52) U.S. Cl.
CPC ........... *G06T 19/006* (2013.01); *G06F 3/017* (2013.01)

(58) Field of Classification Search
None
See application file for complete search history.

(56) References Cited

U.S. PATENT DOCUMENTS

| | | | |
|---|---|---|---|
| 11,553,969 B1 | 1/2023 | Lang et al. | |
| 2007/0270680 A1* | 11/2007 | Sheffer | A61B 34/20 |
| | | | 600/407 |
| 2017/0367766 A1* | 12/2017 | Mahfouz | A61F 2/3859 |
| 2020/0069373 A1 | 3/2020 | Yu et al. | |
| 2020/0159313 A1* | 5/2020 | Gibby | A61B 90/36 |
| 2020/0383803 A1 | 12/2020 | Wu et al. | |
| 2021/0121237 A1* | 4/2021 | Fanson | A61B 34/20 |
| 2021/0201476 A1 | 7/2021 | Prasad et al. | |
| 2022/0301268 A1* | 9/2022 | Porat | A61B 90/36 |

OTHER PUBLICATIONS

Nicolau, Stéphane, et al. "Augmented reality in laparoscopic surgical oncology." Surgical oncology 20.3 (2011): 189-201.

* cited by examiner

*Primary Examiner* — Patricia J Park
(74) *Attorney, Agent, or Firm* — Cognition IP, P.C.; Edward Steakley; Saleh Kaihani

(57) ABSTRACT

Various embodiments of an apparatus, methods, systems and computer program products described herein are directed to a Trace Alignment Engine that captures a plurality of coordinates identifying respective locations of a physical surface. Based on the captured plurality of coordinates, the Trace Alignment Engine determines a region(s) of an Augmented Reality (AR) rendering of the physical surface that represents the respective locations. The Trace Alignment Engine determines a mapping of the region of the AR rendering of the physical surface to the respective locations. Based on the mapping, the Trace Alignment Engine displays the AR rendering of the physical surface as a virtual overlay in alignment with the physical surface with concurrent display of a traced line.

19 Claims, 16 Drawing Sheets

200

CAPTURE COORDINATES — 202

DETERMINE REGION — 204

DETERMINE MAPPING — 206

DISPLAY ALIGNED
VIRTUAL OVERLAY — 206

ALIGNMENT OF VIRTUAL OVERLAY BASED ON TRACE GESTURES

CROSS REFERENCE TO RELATED APPLICATIONS

This application is a continuation-in-part of U.S. patent application Ser. No. 18/208,136 entitled "Surgical Navigation Trajectory in Augmented Reality Display," filed on Jun. 9, 2023, the entirety of which is incorporated by reference.

BACKGROUND

Current conventional systems have limitations with regard to two-dimensional (2D) and three-dimensional (3D) images in surgical settings. Surgical planning and surgical navigation are necessary for every medical procedure. A surgeon and their team must have a plan for a case before entering an operating room, not just as a matter of good practice but to minimize malpractice liabilities and to enhance patient outcomes. Surgical planning is often conducted based on medical images including DICOM scans (MRI, CT, etc.), requiring the surgeon to flip through numerous views/slices, and utilizing this information to imagine a 3D model of the patient so that the procedure may be planned. Accordingly, in such a scenario, the best course of action is often a surgeon's judgment call based on the data that they are provided.

SUMMARY

Various embodiments of an apparatus, methods, systems and computer program products described herein are directed to a Trace Alignment Engine. The Trace Alignment Engine aligns a rendering a physical surface as a virtual overlay over the physical surface. For example, the physical surface may be the physical surface of an anatomical region of an individual. The individual may be a patient undergoing a surgical procedure. The rendering may be a three-dimensional representation of medical data the corresponds with the anatomical region of the individual.

According to various embodiments, the Trace Alignment Engine captures a plurality of coordinates identifying respective locations of a physical surface. Based on the captured plurality of coordinates, determining at least a region of an Augmented Reality (AR) rendering of the physical surface that represents the respective locations of the physical surface. The Trace Alignment Engine determines a mapping of the region of the AR rendering of the physical surface to the respective locations of the physical surface identified by the captured plurality of coordinates. Based on the mapping, the Trace Alignment Engine displays the AR rendering of the physical surface as a virtual overlay in alignment with the physical surface. Display of the AR rendering as the virtual overlay may further include concurrent display of a traced line captured during performance of a trace interaction. In some embodiments, for example, a trace interaction may be initiated and/or completed by a xxtracexx physical gesture.

In some embodiments, the Trace Alignment Engine detects the trace interaction as a tip of a physical instrument makes continuous contact with the respective locations of the physical surface.

According to various embodiments, the Trace Alignment Engine aligns as a virtual overlay of a rendering of 3D cloud point representation of a portion of a patient's physical anatomy.

According to various embodiments, the Trace Alignment Engine captures a plurality of coordinates that identify respective locations on the physical surface. The plurality of coordinates are captured based on detection of the tip of the physical instrument traveling along the physical surface during a trace interaction.

In various embodiments, the Trace Alignment Engine identifies a region of the 3D cloud point representation that includes data with similar geometrical correspondences as the coordinates captured during the trace interaction.

In one or more embodiments, the Trace Alignment Engine maps the identified region of the 3D cloud point representation to the coordinates captured during the trace interaction in order to display the 3D cloud point representation as a virtual overlay in alignment with the portion of a patient's physical anatomy where the trace interaction occurred.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1A:
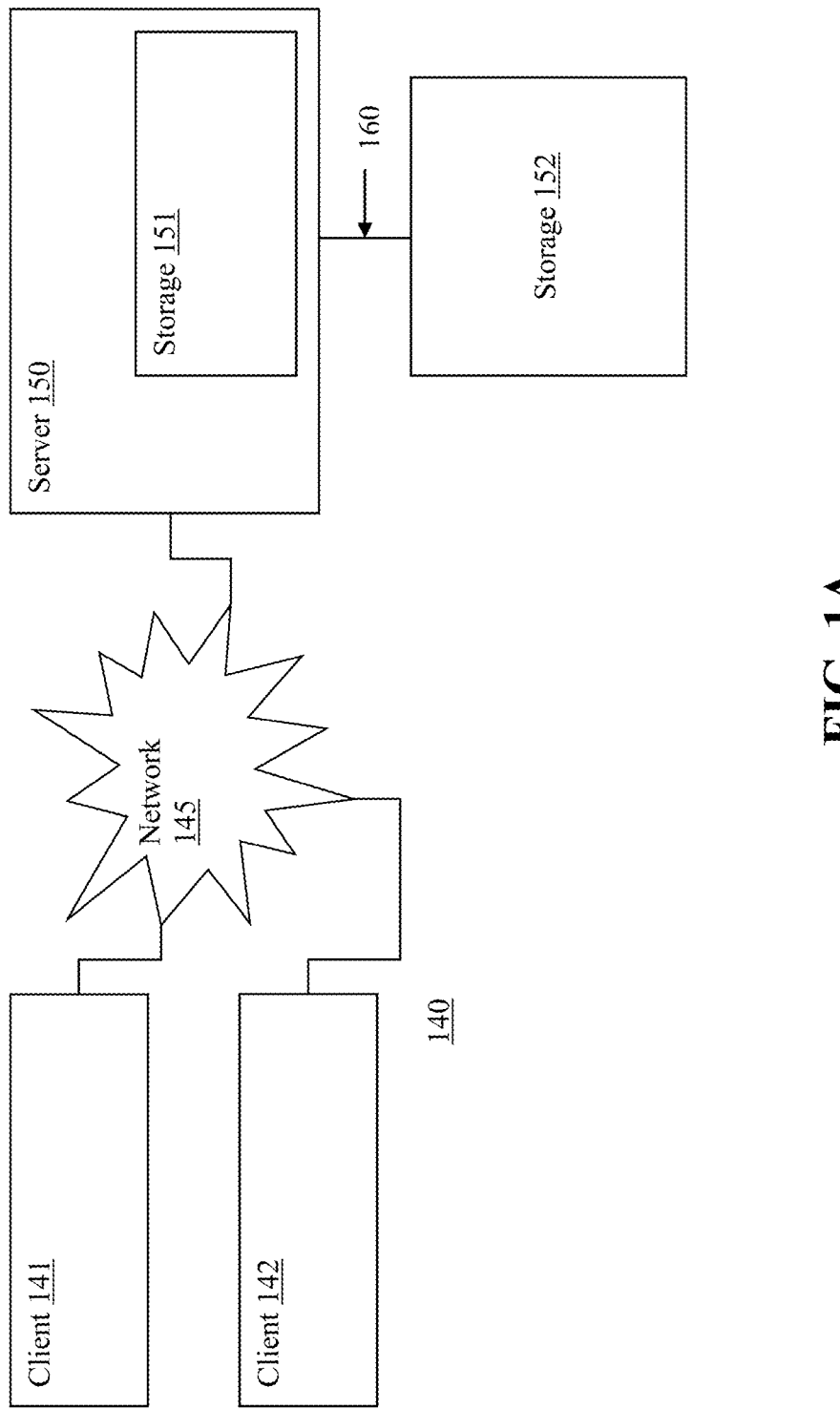
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

A diagram of exemplary network environment in which embodiments may operate is shown in FIG. 1A. In the exemplary environment 140, two clients 141, 142 are connected over a network 145 to a server 150 having local storage 151. Clients and servers in this environment may be computers. Server 150 may be configured to handle requests from clients.

The exemplary environment 140 is illustrated with only two clients and one server for simplicity, though in practice there may be more or fewer clients and servers. The computers have been termed clients and servers, though clients can also play the role of servers and servers can also play the role of clients. In some embodiments, the clients 141, 142 may communicate with each other as well as the servers. Also, the server 150 may communicate with other servers.

The network 145 may be, for example, local area network (LAN), wide area network (WAN), telephone networks, wireless networks, intranets, the Internet, or combinations of networks. The server 150 may be connected to storage 152 over a connection medium 160, which may be a bus, crossbar, network, or other interconnect. Storage 152 may be implemented as a network of multiple storage devices, though it is illustrated as a single entity. Storage 152 may be a file system, disk, database, or other storage.

In an embodiment, the client 141 may perform the method 200 or other method herein and, as a result, store a file in the storage 152. This may be accomplished via communication over the network 145 between the client 141 and server 150. For example, the client may communicate a request to the server 150 to store a file with a specified name in the storage 152. The server 150 may respond to the request and store the file with the specified name in the storage 152. The file to be saved may exist on the client 141 or may already exist in the server's local storage 151. In another embodiment, the server 150 may respond to requests and store the file with a specified name in the storage 151. The file to be saved may exist on the client 141 or may exist in other storage accessible via the network such as storage 152, or even in storage on the client 142 (e.g., in a peer-to-peer system).

In accordance with the above discussion, embodiments can be used to store a file on local storage such as a disk or on a removable medium like a flash drive, CD-R, or DVD-R. Furthermore, embodiments may be used to store a file on an external storage device connected to a computer over a connection medium such as a bus, crossbar, network, or other interconnect. In addition, embodiments can be used to store a file on a remote server or on a storage device accessible to the remote server.

Furthermore, cloud computing is another example where files are often stored on remote servers or remote storage systems. Cloud computing refers to pooled network resources that can be quickly provisioned so as to allow for easy scalability. Cloud computing can be used to provide software-as-a-service, platform-as-a-service, infrastructure-as-a-service, and similar features. In a cloud computing environment, a user may store a file in the "cloud," which means that the file is stored on a remote network resource though the actual hardware storing the file may be opaque to the user.

Figure 1B:
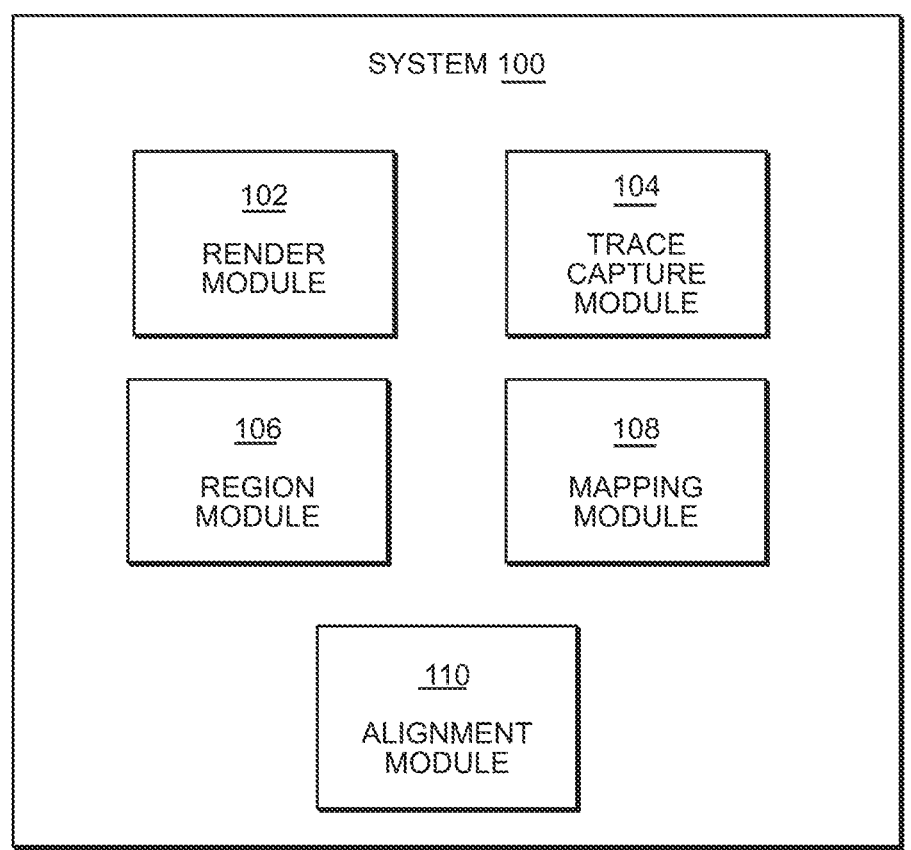
FIG. 1B is a diagram illustrating an exemplary environment in which some embodiments may operate.

FIG. 1B illustrates a block diagram of an example system 100 for a Trace Alignment Engine that includes one or more modules. The system 100 may communicate with a user device 140 to display output, via a user interface 144 generated by an application engine. In various embodiments, the user device 140 may be an AR display headset device that further includes one or more of the respective modules 102, 104, 106, 108, 110.

A render module 102 of the system 100 may perform functionality, steps, operations, commands and/or instructions as illustrated in one or more of FIGS. 2, 3, 4A, 4B, 4C, 4D, 4E, 4F, 5A, 5B, 6A, 6B and 6C (hereinafter "FIGS. 2-6C"). The generator module 102 may generate and render an AR rendering of a physical surface and/or portion of physical anatomy. The generator module 102 may generate and render a virtual overlay. The generator module 102 may generate and render a traced line.

The capture module 104 of the system 100 may perform functionality, steps, operations, commands and/or instructions as illustrated in one or more of FIGS. 2-6C. The capture module 104 may capture a plurality of coordinates identifying respective locations of a physical surface.

The region module 106 of the system 100 may perform functionality, steps, operations, commands and/or instructions as illustrated in one or more of FIGS. 2-6C. The region module 106 may determine respective regions of an AR rendering and the physical surface.

The mapping module 108 of the system 100 may perform functionality, steps, operations, commands and/or instructions as illustrated in one or more of FIGS. 2-6C. The mapping module 108 may determine a mapping of a region of an AR rendering of the physical surface to the respective locations of the physical surface identified by the captured plurality of coordinates.

The alignment module 110 of the system 100 may perform functionality, steps, operations, commands and/or instructions as illustrated in one or more of FIGS. 2-6C. The alignment module 110 may display the AR rendering of the physical surface as a virtual overlay in alignment with the physical surface.

A database associated with the system 100 maintains information, such as 3D medical model data, in a manner the promotes retrieval and storage efficiency and/or data security. In addition, the model data may include rendering parameters, such as data based on selections and modifications to a 3D virtual representation of a medical model rendered for a previous Augmented Reality display. In various embodiments, one or more rendering parameters may be preloaded as a default value for a rendering parameter in a newly initiated session of the Trace Alignment Engine.

In various embodiments, the Trace Alignment Engine accesses one or more storage locations that contain respective portions of medical model data. The medical model data may be represented according to two-dimensional (2D) and three-dimensional (3D) medical model data. The 2D and/or 3D ("2D/3D") medical model data 124 may include a plurality of slice layers of medical data associated with external and internal anatomies. For example, the 2D/3D medical model data 124 may include a plurality of slice layers of medical data for generating renderings of external and internal anatomical regions of a user's head, brain and skull. It is understood that various embodiments may be directed to generating displays of any internal or external anatomical portions of the human body and/or animal bodies. In some embodiments, 2D/3D medical model data may be accessible and portrayed via a 3D cloud point representation of an anatomical region.

The Trace Alignment Engine renders the 3D virtual medical model in an AR display based on the 3D medical model data. In addition, the Trace Alignment Engine renders the 3D virtual medical model based on model pose data which describes an orientation and position of the rendering of the 3D virtual medical model. The Trace Alignment Engine applies the model pose data to the 3D medical model data to determine one or more positional coordinates in the unified 3D coordinate system for portion(s) of model data of a slice layer(s) that represent various anatomical locations.

The Trace Alignment Engine further renders the 3D virtual medical model based on a current device pose of an AR headset device worn by the user. The current device pose represents a current position and orientation of the AR headset device in the physical world. The Trace Alignment Engine translates the current device pose to a position and orientation within the unified 3D coordinate system to determine the user's perspective view of the AR display. The Trace Alignment Engine generates a rendering of the 3D virtual medical model according to the model pose data for display to the user in the AR display according to the user's perspective view. Similarly, the Trace Alignment Engine generates instrument pose data based on a current pose of a physical instrument. The current instrument pose represents a current position and orientation of a physical instrument in the physical world. For example, the physical instrument may be held by a user's hands and may have one or more fiducial markers. The Trace Alignment Engine translates the current instrument pose to a position and orientation within the unified 3D coordinate system to determine the physical instrument's display position and orientation in the AR display and/or placement with respect to one or more virtual objects. It is understood that the Trace Alignment Engine continually updates the instrument pose data to represent subsequent changes in the position and orientation of the physical instrument.

Various embodiments described herein provide functionality for selection of menu functionalities and positional display coordinates. For example, the Trace Alignment Engine tracks one or more physical gestures such as movement of a user's hand(s) and/or movement of a physical instrument(s) via one or more tracking algorithms to determine directional data to further be utilized in determining whether one or more performed physical gestures indicate a selection of one or more types of functionalities accessible via the AR display and/or selection and execution of a virtual interaction(s). For example, the Trace Alignment Engine may track movement of the user's hand that results in movement of a physical instrument and/or one or more virtual offsets and virtual objects associated with the physical instrument. The Trace Alignment Engine may determine respective positions and changing positions of one or more hand joints or one or more portions of the physical instrument. In various embodiments, the Trace Alignment Engine may implement a simultaneous localization and mapping (SLAM) algorithm.

The Trace Alignment Engine may generate directional data based at least in part on average distances between the user's palm and the user's fingers and/or hand joints or distances between portions (physical portions and/or virtual portions) of a physical instrument. In some embodiments, the Trace Alignment Engine generates directional data based on detected directional movement of the AR headset device worn by the user. The Trace Alignment Engine determines that the directional data is based on a position and orientation of the user's hand(s) (or the physical instrument) that indicates a portion(s) of a 3D virtual object with which the user seeks to select and/or virtually interact with and/or manipulate.

According to various embodiments, the Trace Alignment Engine may implement a collision algorithm to determine a portion of a virtual object the user seeks to select and/or virtually interact with. For example, the Trace Alignment Engine may track the user's hands and/or the physical instrument according to respective positional coordinates in the unified 3D coordinate system that correspond to the orientation of the user's hands and/or the physical instrument in the physical world. The Trace Alignment Engine may detect that one or more tracked positional coordinates may overlap (or be the same as) one or more positional coordinates for displaying a particular portion(s) of a virtual object. In response to detecting the overlap (or intersection), the Trace Alignment Engine determines that the user seeks to select and/or virtually interact with the portion(s) of the particular virtual object displayed at the overlapping positional coordinates.

According to various embodiments, upon determining the user seeks to select and/or virtually interact with a virtual object, the Trace Alignment Engine may detect one or more changes in hand joint positions and/or physical instrument positions and identify the occurrence of the position changes as a performed selection function. For example, a performed selection function may represent an input command to the Trace Alignment Engine confirming the user is selecting a portion of a virtual object via a ray casting algorithm and/or collision algorithm. For example, the performed selection function may also represent an input command to the Trace Alignment Engine confirming the user is selecting a particular type of virtual interaction functionality. For example, the user may perform a physical gesture of tips of two fingers touching to correspond to a virtual interaction representing an input command, such as a select input command.

The Trace Alignment Engine identifies one or more virtual interactions associated with the detected physical gestures. In various embodiments, the Trace Alignment Engine identifies a virtual interaction selected by the user, or to be performed by the user, based on selection of one or more functionalities from a 3D virtual menu displayed in the AR display. In addition, the Trace Alignment Engine identifies a virtual interaction selected by the user according to one or more pre-defined gestures that represent input commands for the Trace Alignment Engine. In some embodiments, a particular virtual interaction may be identified based on a sequence of performed physical gestures detected by the Trace Alignment Engine. In some embodiments, a particular virtual interaction may be identified as being selected by the user based on a series of preceding virtual interactions.

Figure 2:
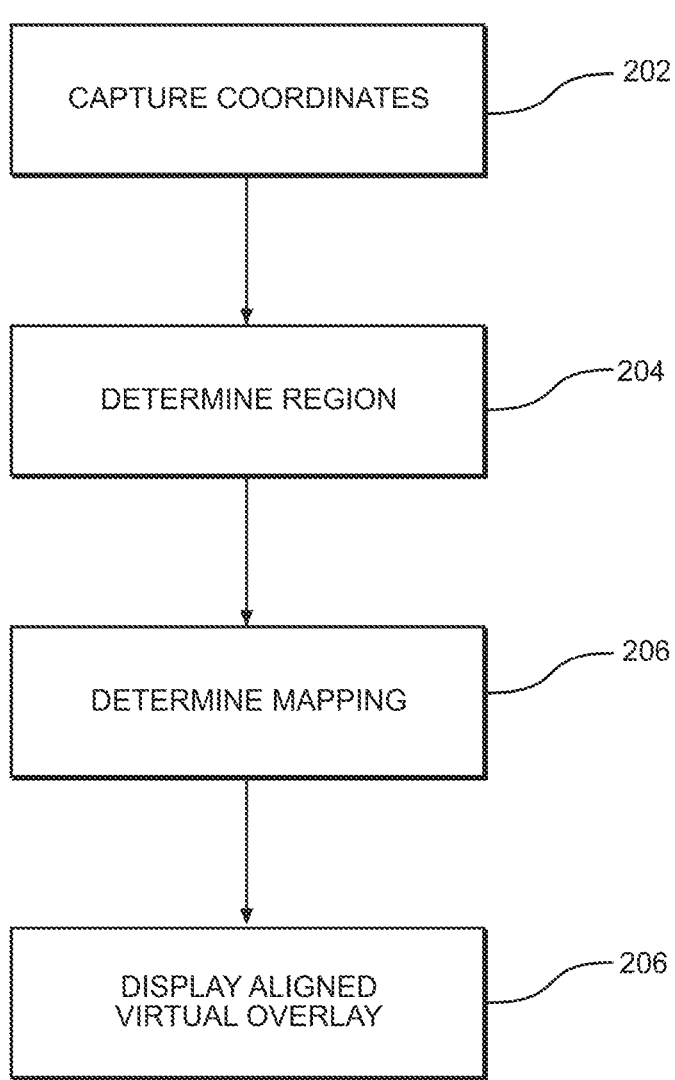
FIG. 2 is a diagram illustrating an exemplary method that may be performed in some embodiments.

As shown in the flowchart 200 of FIG. 2, at step 202, the Trace Alignment Engine captures a plurality of coordinates identifying respective locations of a physical surface. For example, the Trace Alignment Engine detects a trace interaction performed with a physical instrument on a surface of a portion of physical anatomy. For example, the trace interaction may be performed on a patient's skin. For example, the trace interaction may be performed as a tip of a physical instrument is detected by the Trace Alignment Engine as dwelling within a range of proximity to a location on the patient's skin for a particular amount of time.

The Trace Alignment Engine tracks the successive positions and orientations of the physical instrument during the trace interaction. For example, the trace interaction may involve a user holding and guiding the physical instrument while the a tip of the physical instrument is in contact with the physical surface. The trace interaction mimics the movements one would observe if the user were to be tracing, or drawing, a continuous line (or shape) on the physical surface. The Trace Alignment Engine determines the coordinates of the tip of the physical instrument based on the tracked the successive positions and orientations of the physical instrument during the trace interaction. Since the tip is in contact with the physical surface, the coordinates of the tip also represent particular locations on the physical surface.

At step 204, based on the captured plurality of coordinates, the Trace Alignment Engine determines a region(s) of an Augmented Reality (AR) rendering of the physical surface that represents the respective locations of the physical surface. In some embodiments, the AR rendering may be based on a scan of the physical surface. For example, the AR rendering may be a 3D cloud point representation of an anatomical region that includes the physical surface. It is understood that embodiments of the Trace Alignment Engine are not limited to AR renderings that are a 3D cloud point representation of an anatomical region.

In various embodiments, the Trace Alignment Engine feeds the coordinates of the physical instrument's tip captured during the trace physical trace gesture into an Iterative Closest Point (ICP) algorithm. The Trace Alignment Engine utilizes the ICP algorithm in order to determine data in the 3D cloud point representation that corresponds to the respective locations of the physical surface over which the tip traversed during the trace physical trace gesture.

Since the physical surface is part of an anatomical region that is stationary, the Trace Alignment Engine determines any or all of positions and orientations of all locations on the physical surface, including the respective locations of the physical surface from the physical trace gesture ("the traced locations"). In addition, the Trace Alignment Engine may further determine additional locations of the physical surface that surrounds one or more of the traced locations ("the surrounding locations"). The Trace Alignment Engine identifies geometrical relationships between the respective traced locations of the physical surface, as well as geometrical relationships between the respective traced locations and the surrounding locations on the physical surface.

At step 206, the Trace Alignment Engine determines a mapping of the region of the AR rendering of the physical surface to the respective locations of the physical surface identified by the captured plurality of coordinates. In various embodiments, the Trace Alignment Engine identifies presence of similar geometrical relationships in the data of the 3D cloud point representation. The similar geometrical relationships in the data of the 3D cloud point representation correspond to the geometrical relationships determined on the physical surface with regard to the respective traced locations and the surrounding locations.

The identified geometrical relationships in the data of the 3D cloud point representation thereby represent a region(s) in the 3D cloud point representation that is similar to the region where the plurality of coordinates from the trace interaction where captured on the physical surface. Stated differently, the Trace Alignment Engine identifies the geometrical relationships between the traced locations and the geometrical relationships between the traced locations and the surrounding locations on the physical surface. By identifying the similar geometrical relationships in the data of the 3D cloud point representation, the Trace Alignment Engine identifies a region in the 3D cloud point representation that portrays the same region where the trace interaction was applied. Since the Trace Alignment Engine identifies the same region in the 3D cloud point representation where the trace interaction occurred on the physical surface, the Trace Alignment Engine determines a mapping between the region's data in the 3D cloud point representation and the current coordinates of the region on the physical surface.

At step 208, based on the mapping, the Trace Alignment Engine displays the AR rendering of the physical surface as a virtual overlay in alignment with the physical surface. In various embodiments, the Trace Alignment Engine applies the mapping to the region's data in the 3D cloud point representation and aligns region's data in the 3D cloud point representation with the traced locations on the physical surface. The Trace Alignment Engine displays the 3D cloud point representation as a virtual overlay directly above the physical surface.

Figure 3:
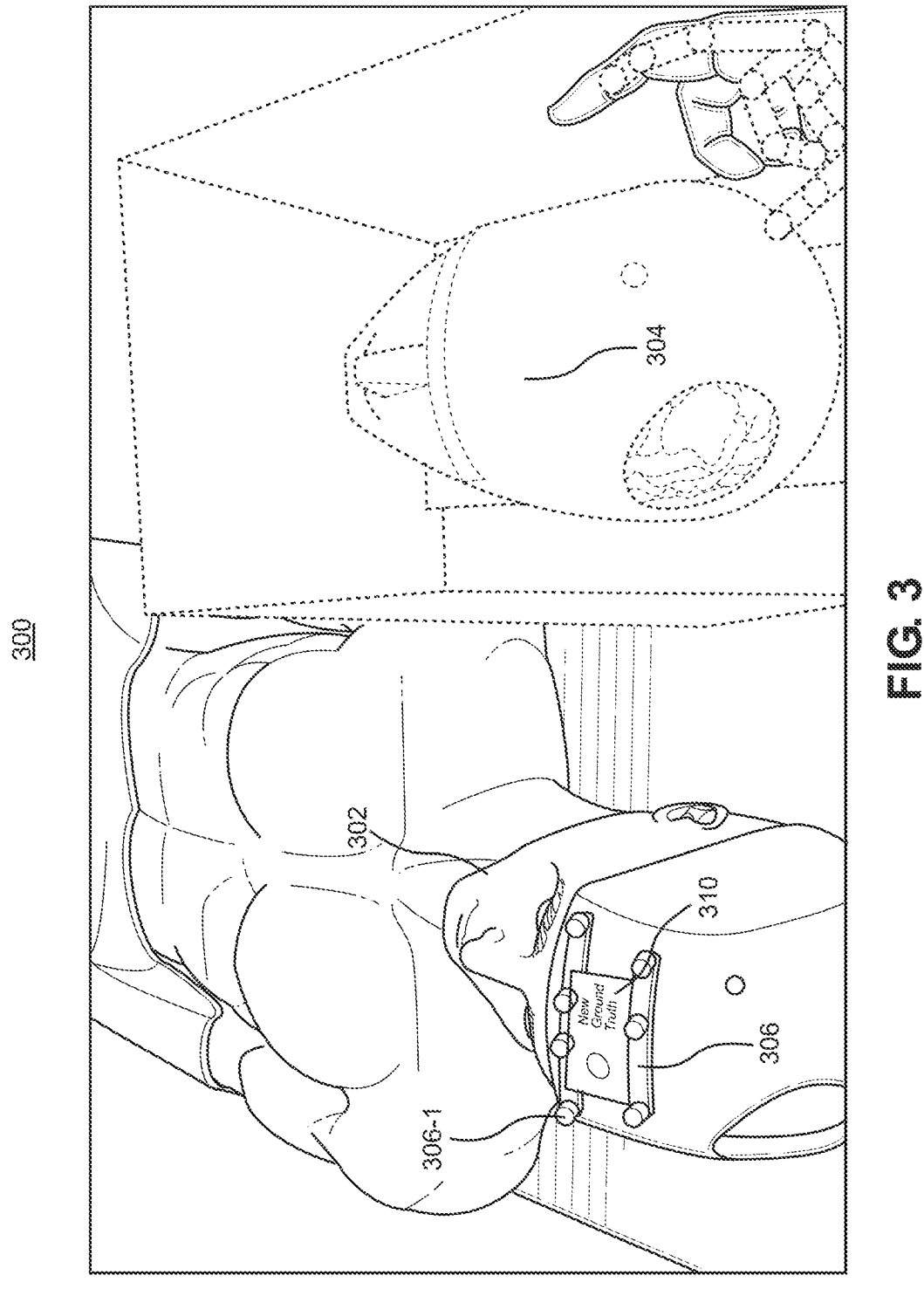
FIG. 3 is a diagram illustrating an exemplary environment in which some embodiments may operate.

As shown in FIG. 3, the Trace Alignment Engine displays an AR rendering 304 in an AR display 300 that also includes a concurrent view of a portion of physical anatomy 302. For example, the AR rendering 304 may be a 3D cloud point representation of a patient's head displayed concurrently with display of the actual patient. A fiducial marker reference array(s) 306, 306-1 may be affixed on the portion of the physical anatomy 302. The Trace Alignment Engine may utilize the position and orientation of the fiducial marker reference array(s) 306, 306-1 as a reference point(s) for determining respective positions and orientations of the portion of the physical anatomy 302, the traced locations and the surrounding locations. The Trace Alignment Engine may also display one or more virtual objects 310 near the fiducial marker reference array(s) 306, 306-1.

Figure 4A:
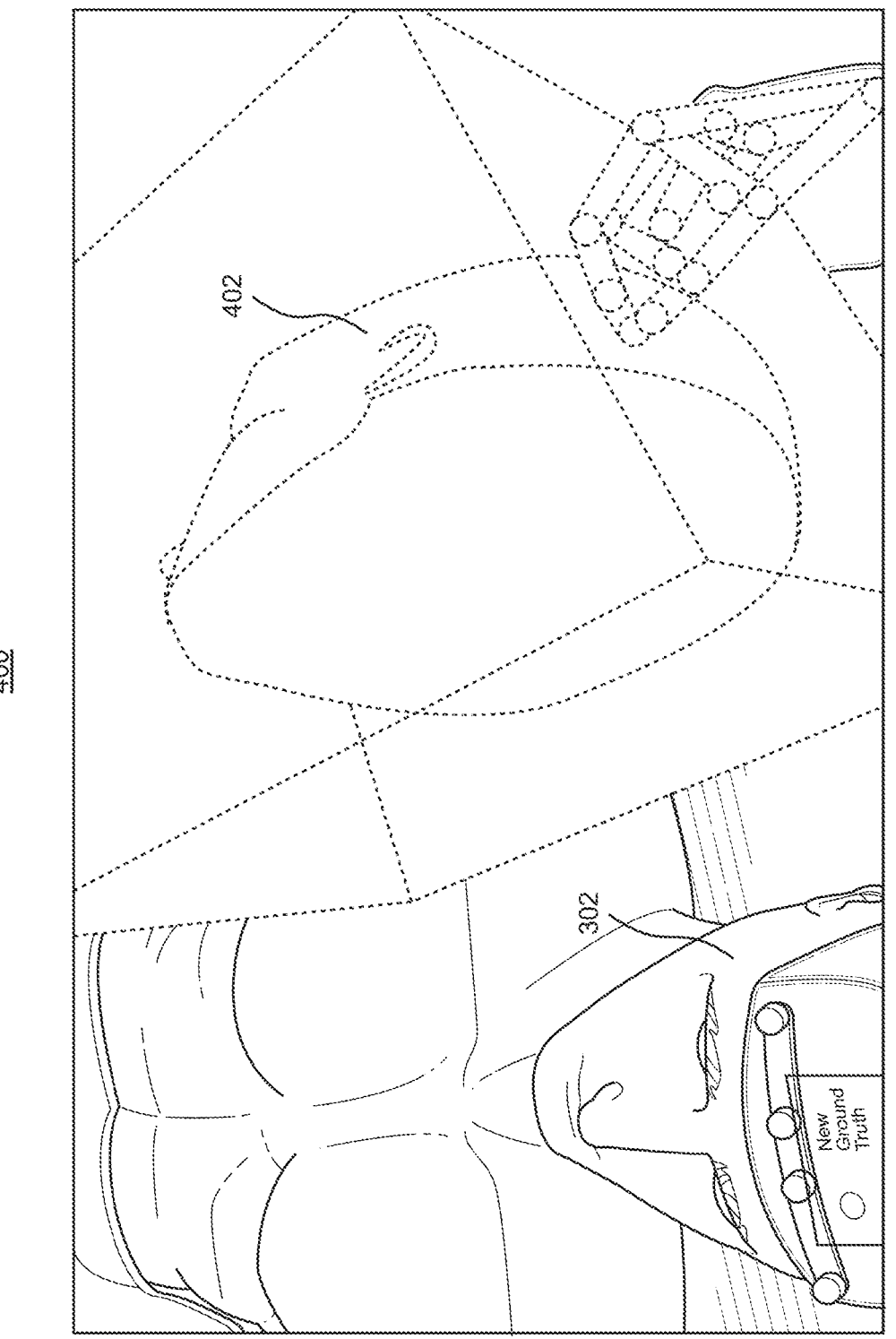
FIG. 4A is a diagram illustrating an exemplary environment in which some embodiments may operate.

As shown in FIG. 4A, the Trace Alignment Engine may acquire medical scan data of the portion of physical anatomy 302 and generate a 3D cloud point representation 402 of the portion of physical anatomy 302. The Trace Alignment Engine may display the 3D cloud point representation 402 in an AR display 402 that includes a concurrent view of the portion of physical anatomy 302.

Figure 4B:
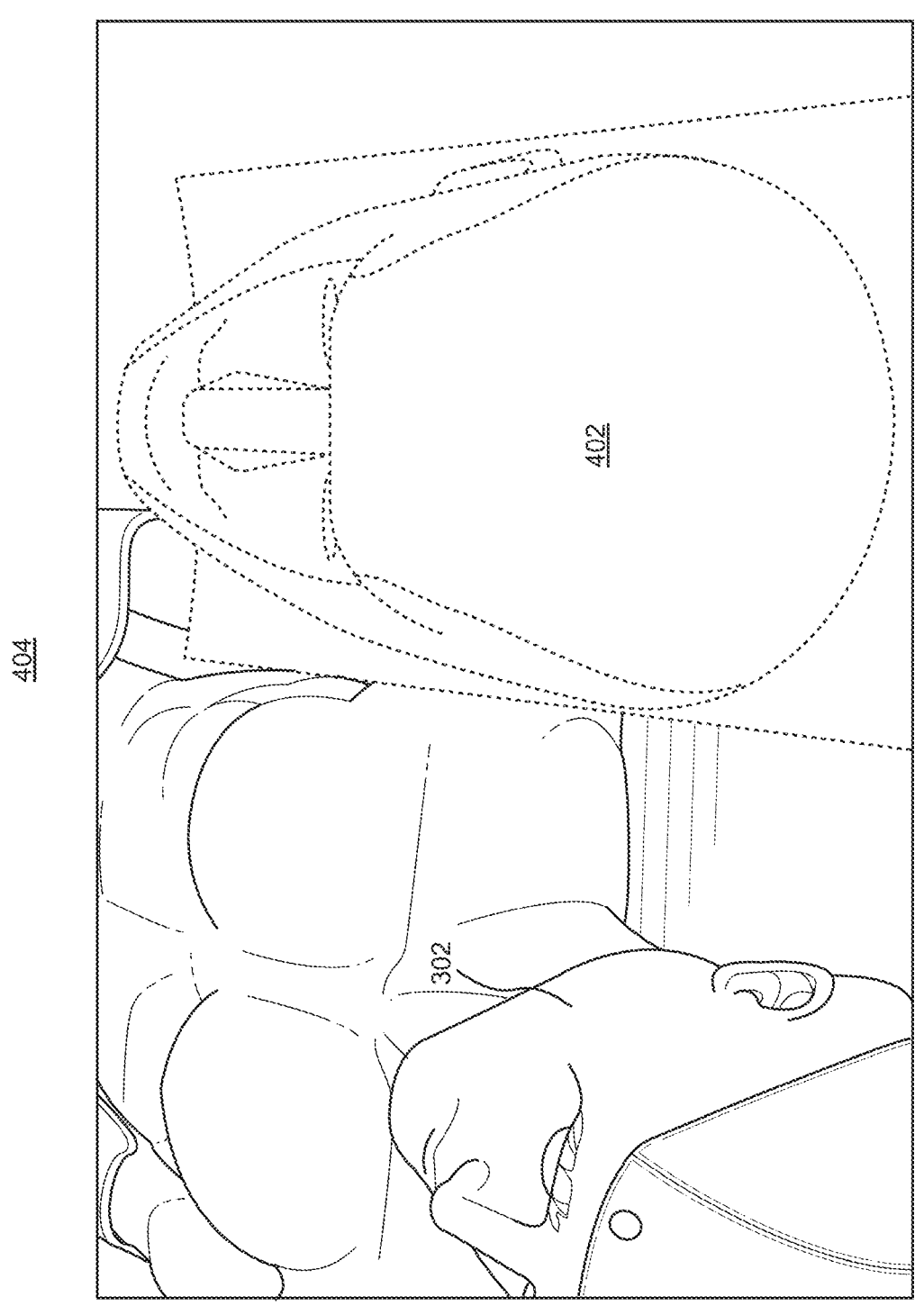
FIG. 4B is a diagram illustrating an exemplary environment in which some embodiments may operate.

As shown in FIG. 4B, the Trace Alignment Engine may display the 3D cloud point representation 402 in an AR display 402 that includes a concurrent view of the portion of physical anatomy 302.

Figure 4C:
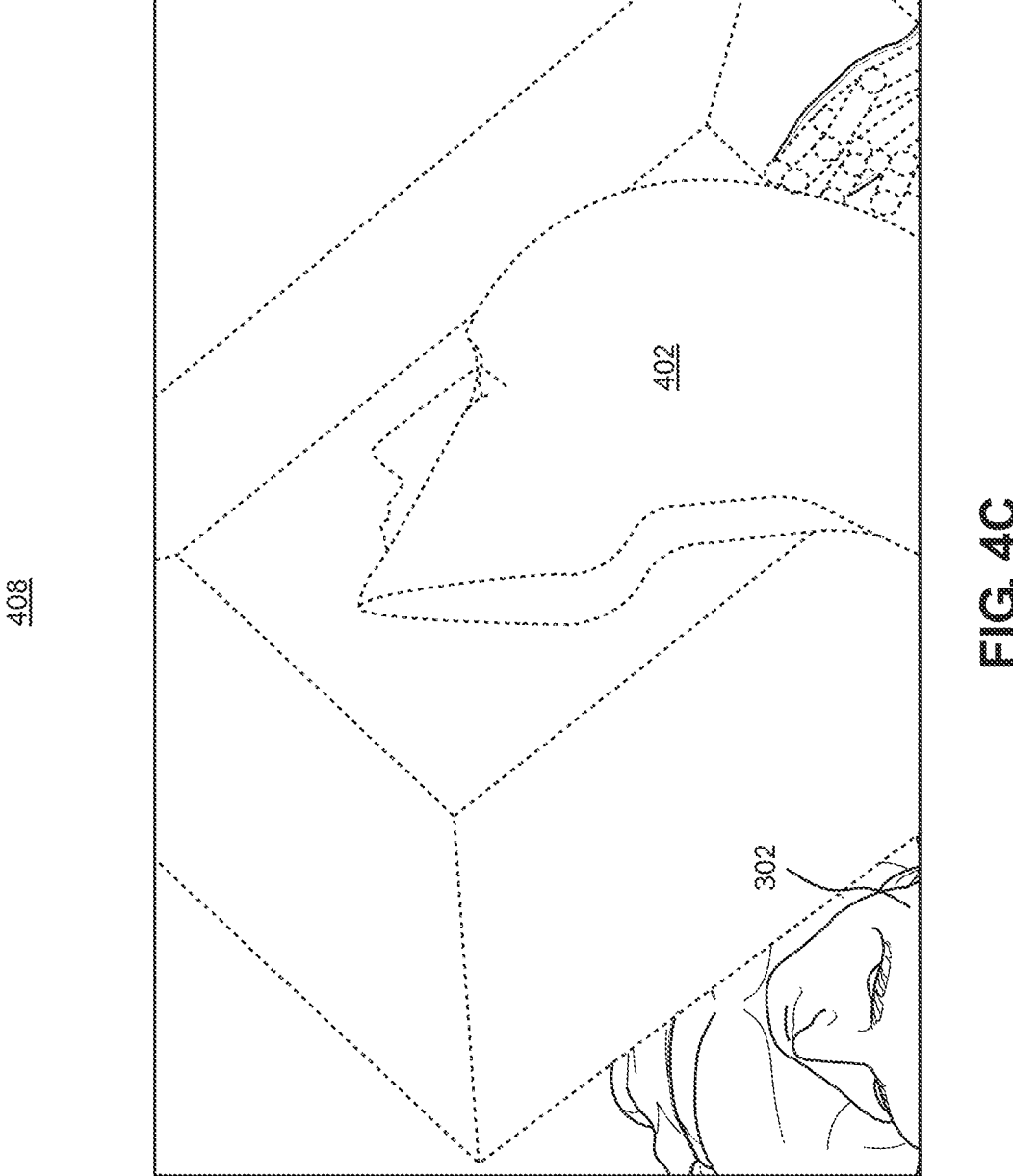
FIG. 4C is a diagram illustrating an exemplary environment in which some embodiments may operate.

As shown in FIG. 4C, the Trace Alignment Engine may detect physical gestures applied to the 3D cloud point representation 402 in an AR display 408. Based on the detected physical gestures, the Trace Alignment Engine may update the AR display 408 to visualize the 3D cloud point representation 402 being virtually manipulated in response to the detected physical gestures.

Figure 4D:
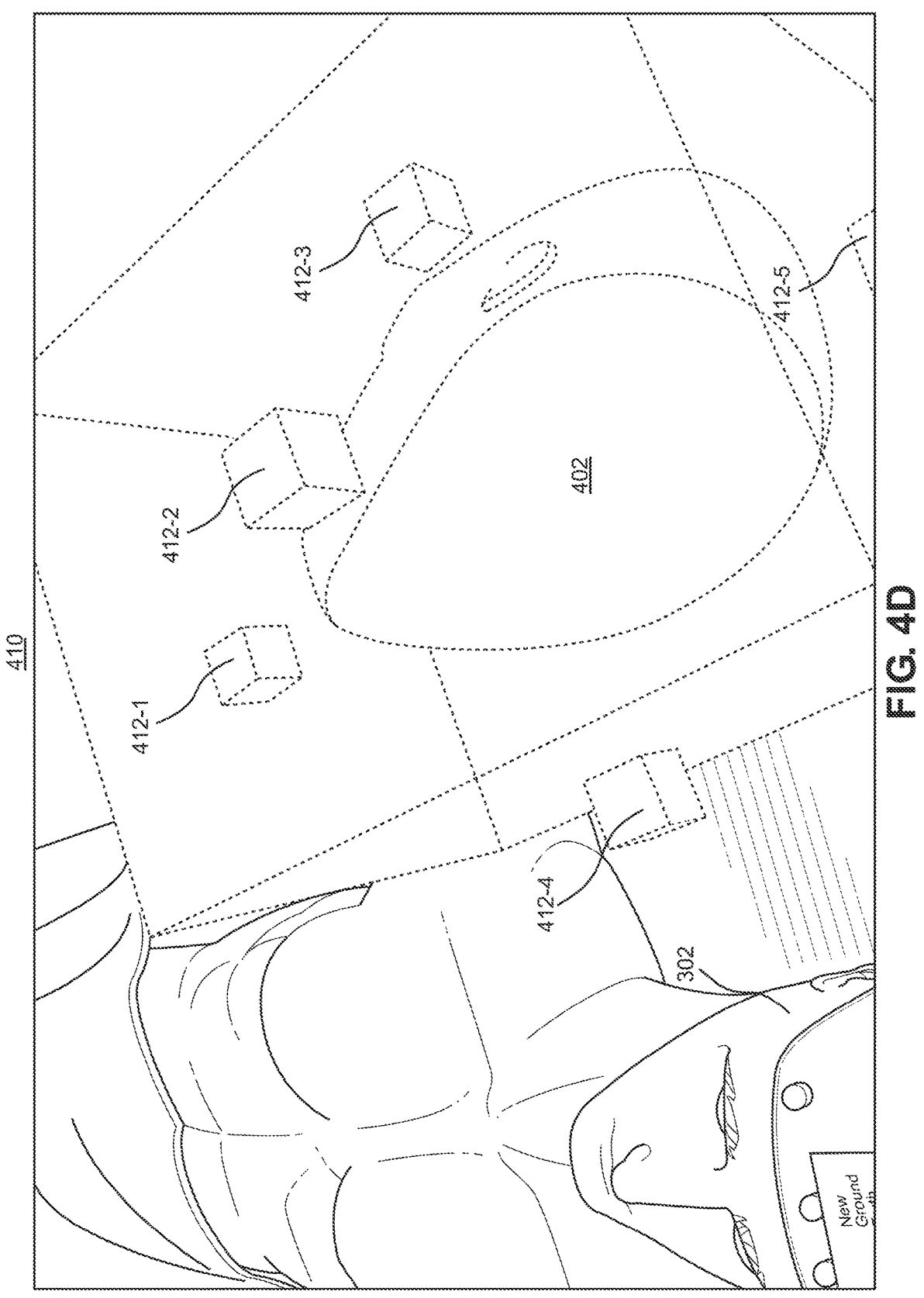
FIG. 4D is a diagram illustrating an exemplary environment in which some embodiments may operate.

As shown in FIG. 4D, the Trace Alignment Engine displays a plurality of virtual objects 412-1, 412-2, 412-3, 412-4, 412-5 surrounding display of the 3D cloud point representation 402 in an AR display 410.

Figure 4E:
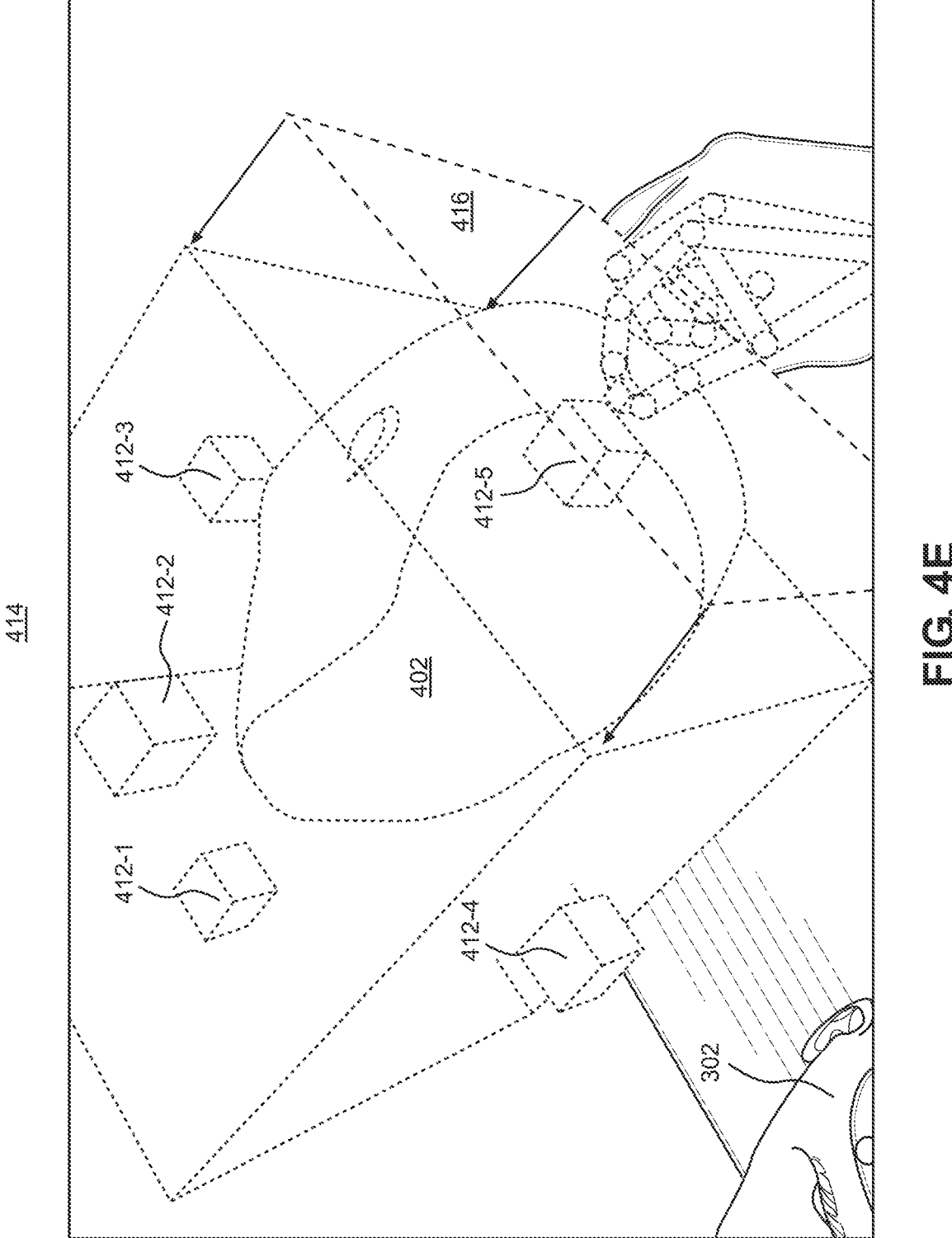
FIG. 4E is a diagram illustrating an exemplary environment in which some embodiments may operate.

As shown in FIG. 4E, each of the virtual objects 412-1, 412-2, 412-3, 412-4, 412-5 are individually selectable and may be moved from a current display position to an updated display location in an AR display 414. In some embodiments, the Trace Alignment Engine detects a clipping plane virtual interaction based on selection of a virtual object 412-5 and movement of the selected virtual object from 412-5 to an updated display position. For example, movement of the selected virtual object from 412-5 results in movement of a corresponding clipping plane 416.

In some embodiments, the Trace Alignment Engine may detect selection of the virtual object 412-5 as selection of the corresponding clipping plane 416. It is understood that the various coordinates associated with the clipping plane 416 include coordinates bounded within the clipping pane 416. In some embodiments, the clipping plane 416 may also be referred to as a virtual object cut plane (i.e. "cut plane").

Figure 4F:
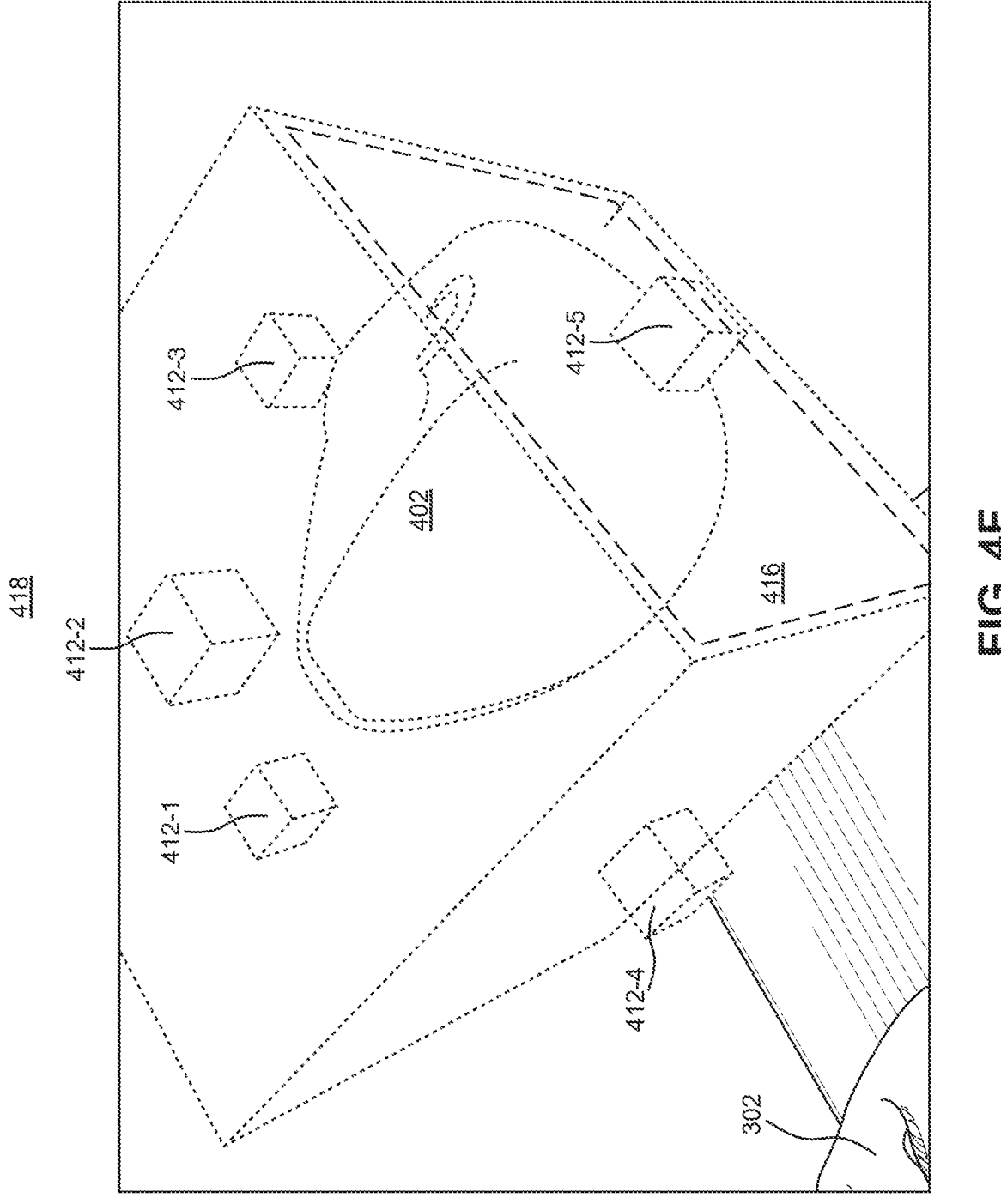
FIG. 4F is a diagram illustrating an exemplary environment in which some embodiments may operate.

As shown in FIG. 4F, the Trace Alignment Engine displays the selected virtual object 412-5 at an updated display position in an AR display 418. The updated display position is a result of a clipping plane virtual interaction that changed a current position and orientation of a corresponding clipping plane 416.

The Trace Alignment Engine displays the clipping plane 416 at a display position as a result of the clipping plane 416 being moved during the clipping plane virtual interaction. For example, the Trace Alignment Engine renders movement of the clipping plane 416 towards the 3D cloud point representation 402.

Due to the movement of the clipping plane 416, the Trace Alignment Engine determines that various coordinates bounded within the clipping plane 416 overlap with coordinates associated with one or more portions of the 3D cloud point representation 402. For example, the Trace Alignment Engine detects that an updated display position of the clipping plane 416 overlaps with coordinates corresponding to anatomical data represented by the 3D cloud point representation 402. The Trace Alignment Engine updates the 3D cloud point representation 402 displayed in the AR display 418 to include portrayal of anatomical data at those overlapping coordinates.

Figure 5A:
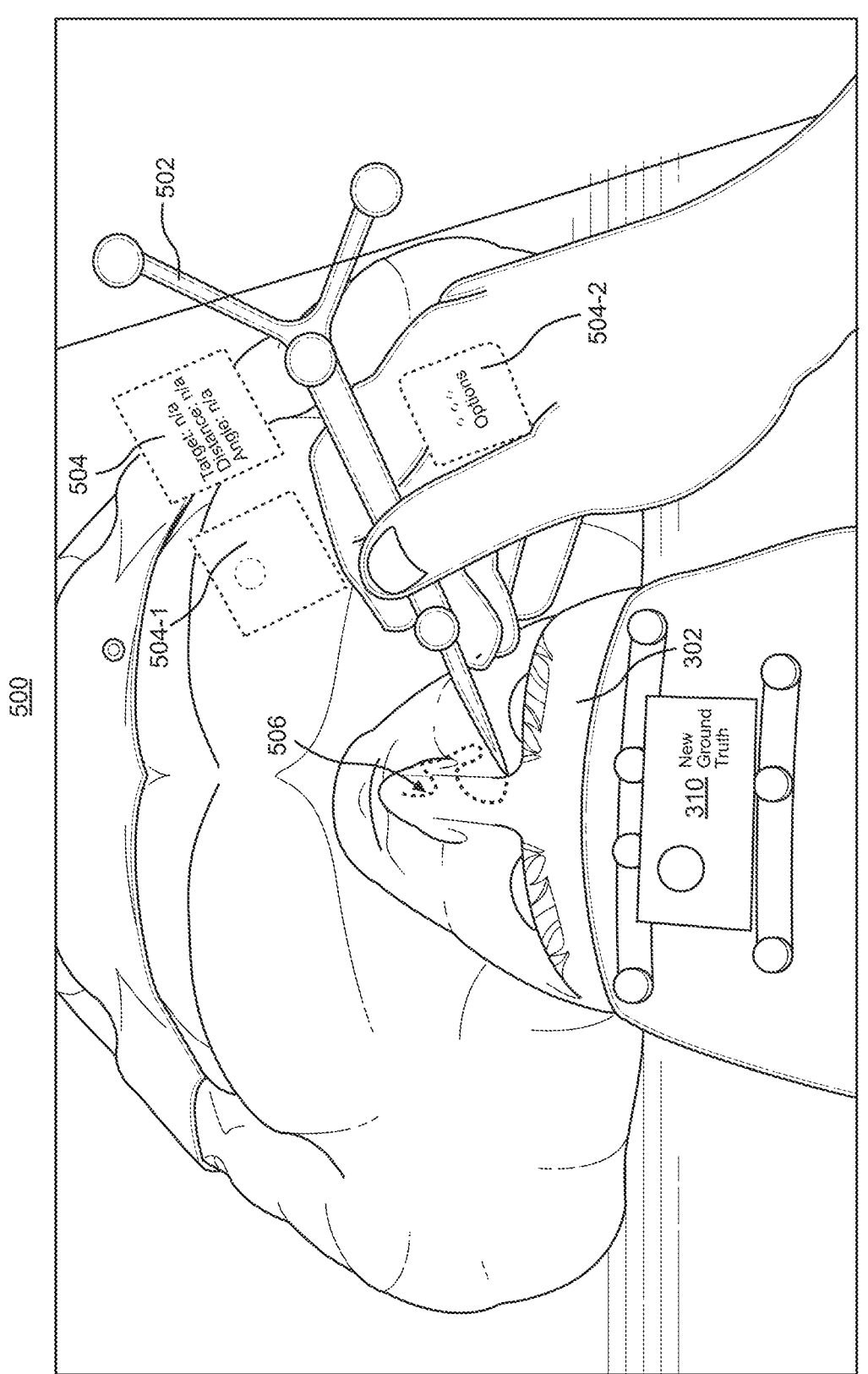
FIG. 5A is a diagram illustrating an exemplary environment in which some embodiments may operate.

As shown in FIG. 5A, the Trace Alignment Engine detects movement of a physical instrument 502 along locations of the physical surface. The Trace Alignment Engine captures respective coordinates of a tip of the physical instrument 502 during the movement of the physical instrument. In some embodiments, the Trace Alignment Engine captures respective coordinates of an AR virtual tip of the physical instrument 502 during the movement of the physical instrument. The Trace Alignment Engine generates an AR display of the plurality of captured coordinates as a traced line.

In various embodiments, the Trace Alignment Engine detects respective positions and orientations of a physical instrument 502 as a user manipulates the physical instrument 502. Based on the detected positions and orientations of a physical instrument 502, the Trace Alignment Engine determines display positions for virtual objects 504, 504-1, 504-2 proximate to a view of the physical instrument in an AR display 500.

The Trace Alignment Engine detects a trace interaction being applied to a physical surface of the portion of physical anatomy 302. The Trace Alignment Engine detects the trace interaction based on the changing positions and orientations of a tip (or virtual tip) of the physical instrument 502. The Trace Alignment Engine may determine current coordinates of the tip based on a current position and orientation of the physical instrument 502 and a fixed distance between the tip and particular part of the physical instrument 502.

During a trace interaction, a user may manipulate the physical instrument 502 to move the tip of the physical instrument 502 along the physical surface of the portion of physical anatomy 302. The Trace Alignment Engine detects successive coordinates representing the changing current position of the tip during performance of the trace interaction. In some embodiments, the Trace Alignment Engine detects that a current position(s) of the tip is within a range of proximity to particular coordinates that reference a location on the physical surface of the portion of physical anatomy 302. The Trace Alignment Engine further determines whether the tip stays (or dwells) within that range of proximity to the particular coordinates for a predetermined period of time. Upon determining that the predetermined period of time has lapsed and that the tip has dwelled within that range of proximity to the particular coordinates during the entirety of the predetermined period of time, the Trace Alignment Engine identifies dwelling of the tip as selection of the particular coordinates to be part of a traced line 506.

Figure 5B:
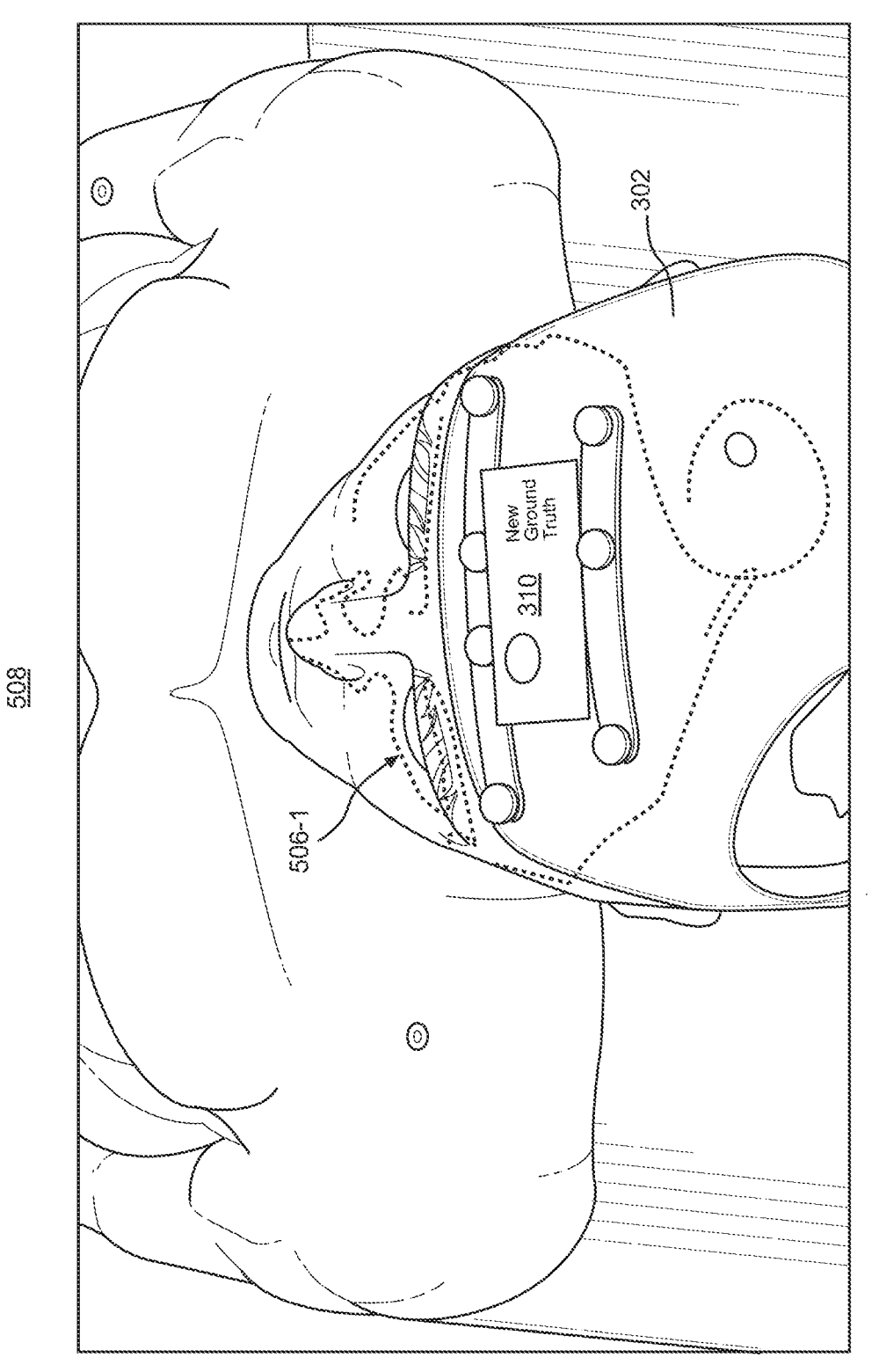
FIG. 5B is a diagram illustrating an exemplary environment in which some embodiments may operate.

In various embodiments, the Trace Alignment Engine generates a contiguous AR display of the plurality of captured coordinates (i.e. the particular coordinates selected via dwelling of the tip) during the trace interaction. The contiguous AR display of the plurality of captured coordinates portrays a virtual traced line 506-1, as shown in FIG. 5B.

Figure 6A:
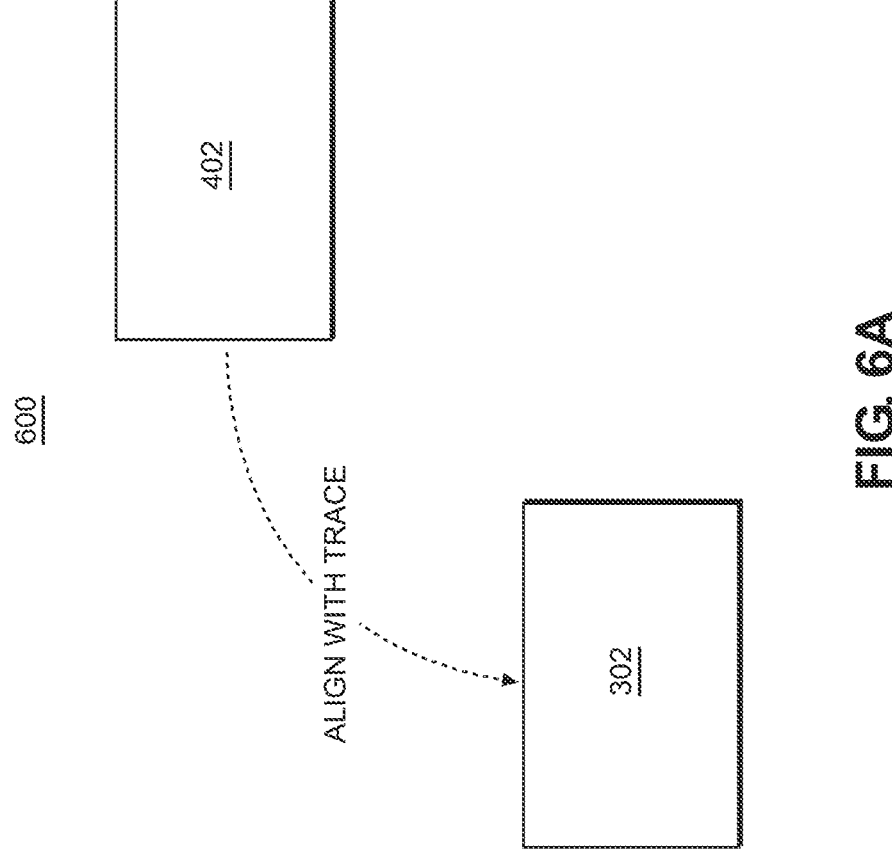
FIG. 6A is a diagram illustrating an exemplary environment in which some embodiments may operate.
Figure 6B:
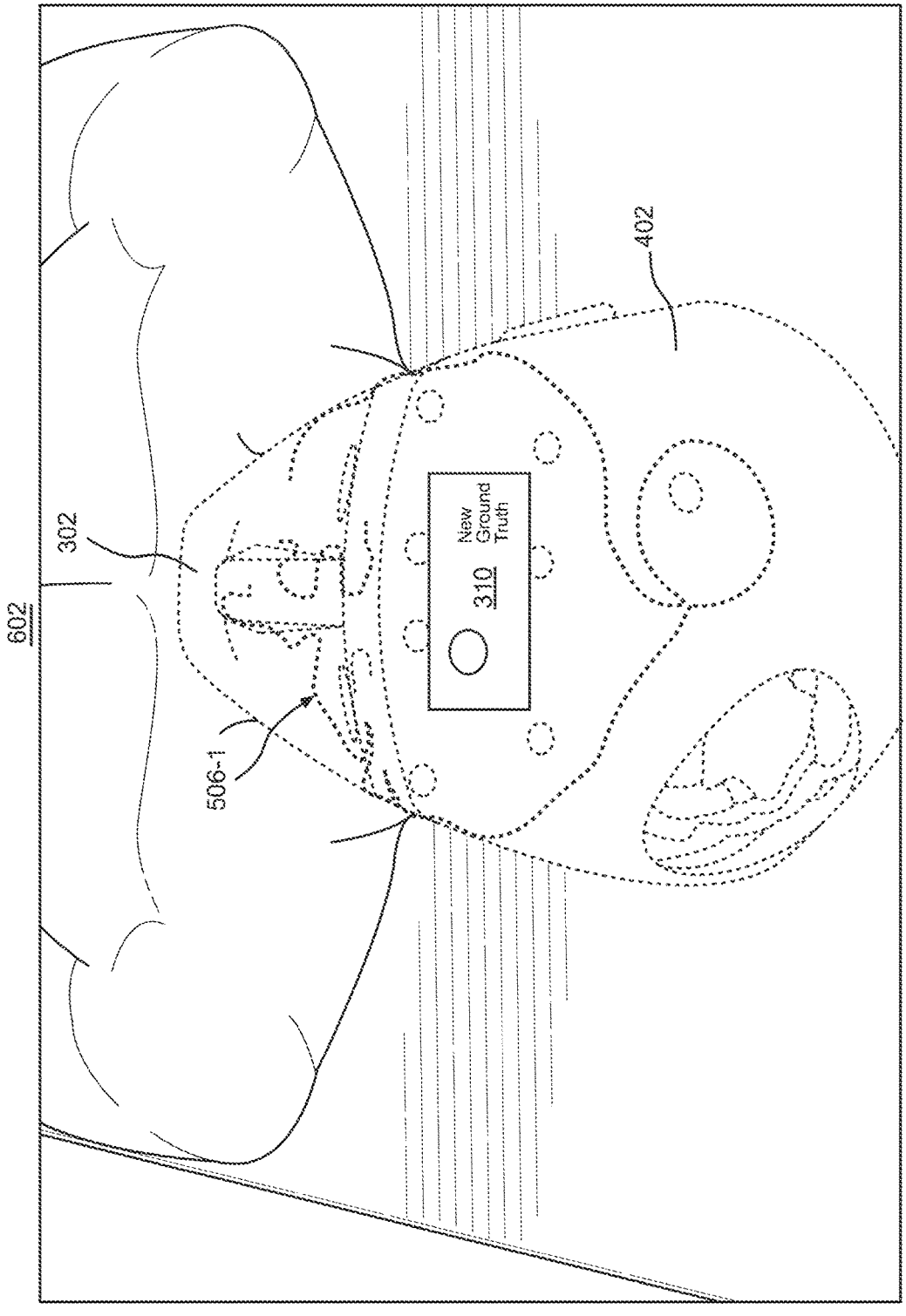
FIG. 6B is a diagram illustrating an exemplary environment in which some embodiments may operate.

As shown in FIG. 6A, the Trace Alignment Engine displays the 3D cloud point representation 402 of the physical surface as a virtual overlay in alignment with the physical surface of the portion of physical anatomy 302. According to various embodiments, display of the 3D cloud point representation 402 as a virtual overlay in alignment with the physical surface of the portion of physical anatomy 302 may further include concurrent display of the traced line 506-1, as shown in FIG. 6B.

Figure 6C:
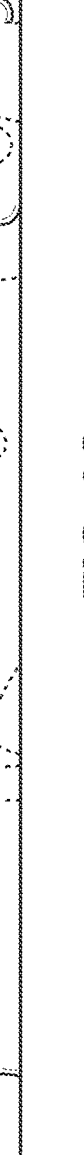
FIG. 6C is a diagram illustrating an exemplary environment in which some embodiments may operate.

As shown in FIG. 6C, the Trace Alignment Engine provides functionality for an offset tip virtual interaction with respect to the physical instrument 502. The Trace Alignment Engine may display a virtual object comprising a virtual offset 606 of the physical instrument 502. For example, the virtual offset 606 may be displayed as a line extending from the tip of the physical instrument 502 to a virtual tip 608. The Trace Alignment Engine modifies an AR display 604 by generating display of a virtual offset 606 and virtual tip 608. It is understood that the virtual offset tip and a virtual offset are virtual objects.

According to various embodiments, the Trace Alignment Engine identifies selection of a target point. For example, the Trace Alignment Engine tracks a physical gesture(s) with respect to the physical instrument 502 that places the virtual tip 608 at coordinates of a display position within the virtual overlay (i.e. the aligned 3D cloud point representation 402). The selected target point thereby corresponds to a portion of data for the 3D cloud point representation 402. For example, the target point may be a display position with particular coordinates that reference data for particular internal anatomical location. The Trace Alignment Engine may determine selection of a target point based on detection a period of dwelling time of the virtual tip 608.

In various embodiments, the Trace Alignment Engine may determine concurrent selection of the target point and the entry point. Upon determining the dwelling of the virtual offset tip and identifying the particular coordinates as the target point, the Trace Alignment Engine concurrently identifies a second set of coordinates that collide with a portion of the virtual offset. The second set of coordinates reference another anatomical location represented by the 3D virtual medical model. For example, the second set of coordinates may reference an anatomical surface location where a surgical instrument will initially make physical contact with a patient's anatomy while traveling along a Trace planned according to the virtual Trace.

The Trace Alignment Engine identifies collision (or overlap) of the portion of the virtual offset with the second set of coordinates—caused by the dwelling to select the target point—as a virtual interaction representing selection of the second set of coordinates as an entry point. Upon determining selection of both the target point and the entry point, the Trace Alignment Engine determines an orientation of the virtual Trace based at least on a current pose of the physical instrument during the dwelling to select the target point ("instrument's dwelling pose"). The Trace Alignment Engine generates the virtual Trace to extend from the target point and through the entry point at an orientation based on the instrument's dwelling pose.

In various embodiments, the Trace Alignment Engine may implement an inline slice panel 610. The inline slice panel 610 may include display of one or more inline slices 612-1, 612-2, 612-3. A respective inline slice 612-1, 612-2 may include display of an instrument indicator that includes a first portion that represents the body of the instrument 502 according to the current position and orientation of the physical instrument 502 (i.e. instrument pose data). The instrument indicator further includes a second portion that represents an extension of the instrument 502 according to the physical instrument's 502 current position and orientation. In some embodiments, the first and second portions are visually distinct from each other.

Figure 7:
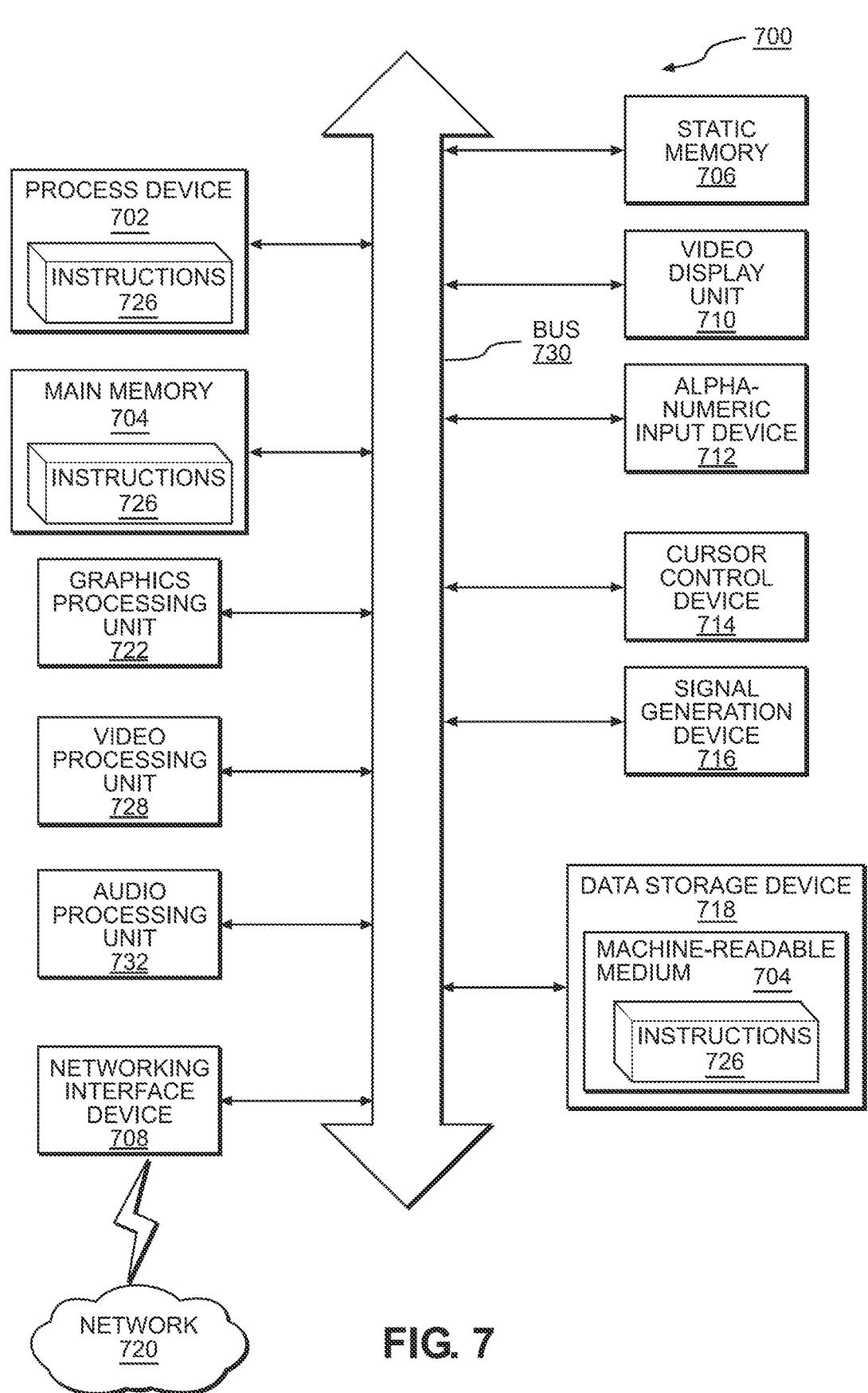
FIG. 7 is a diagram illustrating an exemplary environment in which some embodiments may operate.

FIG. 7 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality corresponding to the components of a device to perform the disclosure herein. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method, comprising:
    capturing a plurality of coordinates identifying respective locations of a physical surface, wherein the coordinates are captured by detecting a trace interaction performed by a physical instrument on a surface portion of physical anatomy, wherein the capturing further comprises tracking successive positions and orientations of coordinates of a tip of the physical instrument during the trace interaction, the coordinates of the tip representing coordinates of the physical surface by virtue of the tip being in contact with the physical surface;

based on the captured plurality of coordinates, determining at least a region of an Augmented Reality (AR) rendering of the physical surface that represents the respective locations of the physical surface, wherein the AR rendering comprises a 3D cloud point representation of an anatomical region comprising the physical surface;

determining data in the 3D cloud point representation corresponding to respective locations of the physical surface traversed by the tip of the physical instrument, during a physical trace gesture;

the physical surface being a part of a stationary anatomical region, determining positions and orientations of physical surface locations from the physical trace gesture, comprising traced locations;

determining additional physical surface locations, comprising surrounding locations of the physical surface locations;

identifying geometrical relationships between the traced locations and the surrounding locations;

determining a mapping of the region of the AR rendering of the physical surface to the respective locations of the physical surface identified by the captured plurality of coordinates, wherein the mapping further comprises:

identifying presence of similar geometrical relationships in the 3D cloud point representation, the 3D cloud point representation corresponding to the geometrical relationships identified between the traced locations and the surrounding locations;

the identified geometrical relationships in the 3D cloud point data representing a region in the 3D cloud point data similar to a region, represented by the plurality of the captured coordinates; and based on the mapping, generating an AR display rendering of the physical surface as a virtual overlay in alignment with the physical surface.

2. The computer-implemented method of claim 1, wherein determining data in the 3D cloud point representation comprises:
    feeding the coordinates of the tip of the physical instrument during the physical trace gesture into an iterative closest point (ICP) algorithm.

3. The computer-implemented method of claim 1, wherein detecting movement of a physical instrument comprises:
    detecting a trace interaction as the physical instrument makes continuous contact with the respective locations of the physical surface.

4. The computer-implemented method of claim 3, wherein generating the AR display of the plurality of captured coordinates comprises:
    displaying a virtual traced line by generating a contiguous AR display of the plurality of captured coordinates of the tip based on current positions and orientations of the physical instrument during the trace interaction; and
    wherein displaying the AR rendering of the physical surface as a virtual overlay in alignment with the physical surface comprises:

concurrently displaying the virtual traced line with display of the virtual overlay.

5. The computer-implemented method of claim 4, wherein generating a contiguous AR display comprises:

generating a virtual trace overlay based on the plurality of captured coordinates of the virtual tip.

6. A system comprising one or more processors, and a non-transitory computer-readable medium including one or more sequences of instructions that, when executed by the one or more processors, cause the system to perform operations comprising:

capturing a plurality of coordinates identifying respective locations of a physical surface, wherein the coordinates are captured by detecting a trace interaction performed by a physical instrument on a surface portion of physical anatomy, wherein the capturing further comprises tracking successive positions and orientations of coordinates of a tip of the physical instrument during the trace interaction, the coordinates of the tip representing coordinates of the physical surface by virtue of the tip being in contact with the physical surface;

based on the captured plurality of coordinates, determining at least a region of an Augmented Reality (AR) rendering of the physical surface that represents the respective locations of the physical surface, wherein the AR rendering comprises a 3D cloud point representation of an anatomical region comprising the physical surface;

determining data in the 3D cloud point representation corresponding to respective locations of the physical surface traversed by the tip of the physical instrument, during a physical trace gesture;

the physical surface being a part of a stationary anatomical region, determining positions and orientations of physical surface locations from the physical trace gesture, comprising traced locations;

determining additional physical surface locations, comprising surrounding locations of the physical surface locations;

identifying geometrical relationships between the traced locations and the surrounding locations;

determining a mapping of the region of the AR rendering of the physical surface to the respective locations of the physical surface identified by the captured plurality of coordinates, wherein the mapping further comprises:

identifying presence of similar geometrical relationships in the 3D cloud point representation, the 3D cloud point representation corresponding to the geometrical relationships identified between the traced locations and the surrounding locations;

the identified geometrical relationships in the 3D cloud point data representing a region in the 3D cloud point data similar to a region, represented by the plurality of the captured coordinates; and based on the mapping, generating an AR display rendering of the physical surface as a virtual overlay in alignment with the physical surface.

7. The system of claim 6, wherein determining data in the 3D cloud point representation comprises:

feeding the coordinates of the tip of the physical instrument during the physical trace gesture into an iterative closest point (ICP) algorithm.

8. The system of claim 6, wherein detecting movement of a physical instrument comprises:

detecting a trace interaction as the physical instrument makes continuous contact with the respective locations of the physical surface.

9. The system of claim 8, wherein generating the AR display of the plurality of captured coordinates comprises:

displaying a virtual traced line by generating a contiguous AR display of the plurality of captured coordinates of the tip based on current positions and orientations of the physical instrument during the trace interaction; and wherein displaying the AR rendering of the physical surface as a virtual overlay in alignment with the physical surface comprises:

concurrently displaying the virtual traced line with display of the virtual overlay.

10. The system of claim 9, wherein generating a contiguous AR display comprises:

generating a virtual trace overlay based on the plurality of captured coordinates of the virtual tip.

11. A computer program product comprising a non-transitory computer-readable medium having a computer-readable program code embodied therein to be executed by one or more processors, the program code including instructions for:

capturing a plurality of coordinates identifying respective locations of a physical surface, wherein the coordinates are captured by detecting a trace interaction performed by a physical instrument on a surface portion of physical anatomy, wherein the capturing further comprises tracking successive positions and orientations of coordinates of a tip of the physical instrument during the trace interaction, the coordinates of the tip representing coordinates of the physical surface by virtue of the tip being in contact with the physical surface;

based on the captured plurality of coordinates, determining at least a region of an Augmented Reality (AR) rendering of the physical surface that represents the respective locations of the physical surface, wherein the AR rendering comprises a 3D cloud point representation of an anatomical region comprising the physical surface;

determining data in the 3D cloud point representation corresponding to respective locations of the physical surface traversed by the tip of the physical instrument, during a physical trace gesture;

the physical surface being a part of a stationary anatomical region, determining positions and orientations of physical surface locations from the physical trace gesture, comprising traced locations;

determining additional physical surface locations, comprising surrounding locations of the physical surface locations;

identifying geometrical relationships between the traced locations and the surrounding locations;

determining a mapping of the region of the AR rendering of the physical surface to the respective locations of the physical surface identified by the captured plurality of coordinates, wherein the mapping further comprises:

identifying presence of similar geometrical relationships in the 3D cloud point representation, the 3D cloud point representation corresponding to the geometrical relationships identified between the traced locations and the surrounding locations;

the identified geometrical relationships in the 3D cloud point data representing a region in the 3D cloud point data similar to a region, represented by the plurality of the captured coordinates; and based on the mapping, generating an AR display rendering of the physical surface as a virtual overlay in alignment with the physical surface.

12. The computer program product of claim 11, wherein determining data in the 3D cloud point representation comprises:

feeding the coordinates of the tip of the physical instrument during the physical trace gesture into an iterative closest point (ICP) algorithm.

13. The computer program product of claim 11, wherein detecting movement of a physical instrument comprises:

detecting a trace interaction as the physical instrument makes continuous contact with the respective locations of the physical surface.

14. The computer program product of claim 12, wherein generating the AR display of the plurality of captured coordinates comprises:

displaying a virtual traced line by generating a contiguous AR display of the plurality of captured coordinates of the tip based on current positions and orientations of the physical instrument during the trace interaction; and wherein displaying the AR rendering of the physical surface as a virtual overlay in alignment with the physical surface comprises:

concurrently displaying the virtual traced line with display of the virtual overlay.

15. The computer program product of claim 14, wherein generating a contiguous AR display comprises:

generating a virtual trace overlay based on the plurality of captured coordinates of the virtual tip.

16. The computer-implemented method of claim 1, further comprising:

determining whether one or more physical gestures indicate a selection of one or more types of functionality accessible, via the AR display;

determining a change in position of a portion of a hand, handling the physical instrument;

generating directional data, at least in part, based on distances between portions of the hand and/or the physical instrument, and/or the detected directional movement of an AR headset; and determining a virtual object selected for interaction.

17. The computer-implemented method of claim 16, further comprising generating a collision algorithm to determine a portion of the virtual object, via tracking the hand movement and/or the physical instrument movement in a unified 3D coordinate system.

18. The computer-implemented method of claim 17, further comprising:

determining an overlap, the overlap indicative of a portion of the virtual object;

detecting a change in position of the hand and/or the physical instrument, indicative of a selection; and identifying one or more virtual interactions associated with detected physical gestures, wherein the virtual interactions correspond to selection of a virtual menu displayed in the AR display, the virtual interactions interpreted according to selected gestures representing an input command.

19. The system of claim 6, wherein the operations further comprise:

determining whether one or more physical gestures indicate a selection of one or more types of functionality accessible, via the AR display;

determining a change in position of a portion of a hand, handling the physical instrument;

generating directional data, at least in part, based on distances between portions of the hand and/or the physical instrument, and/or the detected directional movement of an AR headset; and determining a virtual object selected for interaction.

* * * * *